United States Patent [19]

Rosenquist

[11] Patent Number: 5,275,139
[45] Date of Patent: Jan. 4, 1994

[54] METHOD OF SEALING A HIGH PERFORMANCE AUTOMOTIVE ENGINE AND ENGINE ASSEMBLY

[75] Inventor: Gerald A. Rosenquist, Lake Zurich, Ill.

[73] Assignee: Fel-Pro Incorporated, Skokie, Ill.

[21] Appl. No.: 15,648

[22] Filed: Feb. 9, 1993

[51] Int. Cl.$^5$ ............................................. F16J 15/12
[52] U.S. Cl. ............................. 123/193.3; 277/235 B
[58] Field of Search .................... 123/193.3, 193.5; 277/235

[56] References Cited

U.S. PATENT DOCUMENTS

| 2,788,782 | 4/1957 | Schmidt | 123/193.3 |
| 3,532,349 | 10/1970 | Czernik | 277/235 B |
| 4,662,643 | 5/1987 | Rosenquist | 277/235 B |
| 4,776,601 | 10/1988 | Yamada | 277/235 B |
| 5,120,078 | 6/1992 | Udagawa | 277/235 B |
| 5,125,375 | 6/1992 | Vuk | 123/193.5 |
| 5,215,314 | 6/1993 | Nakaya | 277/235 R |

*Primary Examiner*—Tony M. Argenbright
*Assistant Examiner*—M. Macy
*Attorney, Agent, or Firm*—Laff, Whitesel, Conte & Saret

[57] ABSTRACT

A method of sealing a high performance internal combustion engine with a head gasket having a fire ring comprising providing a groove in the head or block generally concentric with each said combustion opening, each groove having a land area and a generally vertical wall, and positioning the gasket on the block so that when the head is torqued down, each groove receives a fire ring and compresses the wire ring thereof to provide a primary seal therewith at the land area, the wall engages the armor of the fire ring to form a secondary seal, and the head and block clamping surfaces engage the armor to clamp the armor. The head gasket has a main body of a first thickness including a central core and facing layers laminated to the core, and defines a plurality of combustion openings. A fire ring is disposed and secured in each combustion opening, each fire ring comprising a generally U-shaped armor having a pair of legs overlying and underlying the main body adjacent a combustion opening and a central body connecting the legs and ensheathing a wire ring for providing a combustion seal. In use, the combustion seal provides a labyrinth seal against the spaced surfaces of the groove and against a corner defined by the groove.

9 Claims, 2 Drawing Sheets

METHOD OF SEALING A HIGH PERFORMANCE AUTOMOTIVE ENGINE AND ENGINE ASSEMBLY

BACKGROUND OF THE INVENTION

The invention of this application relates to gasketing for high performance racing engines. High output, high performance automobile engines, such as those used for racing, present the gasket and sealing engineer with severe operating conditions that are exceedingly difficult with which to contend. Standard passenger car laminated gaskets, used in a conventional manner, do not stand up to such service conditions and result in blow-out and leakage when cylinder pressures overcome the clamping force of the head bolts or studs. When that happens, the head tends to lift away from the block, unloading the gasket, and providing leakage paths for liquids and gases. Further, if the lifting force is great enough, the combustion seal may be lifted out of position or may otherwise be forced out of position, resulting in engine failure.

A variety of mechanisms have been employed to seek to overcome such problems.

For example, high output racing engine builders for years have used a solid copper gasket and stainless steel wire rings placed in adjacent grooves in the cylinder head or in the block around the cylinders. This is very durable from a combustion seal standpoint, but the sealing of coolants is very difficult and requires multiple, separate auxiliary seals for that purpose.

Other engine builders have used an additional wire ring in a groove around the cylinder adjacent to the gasket body, adjacent to an associated armor having a wire ring. This design is undesirable because the clamping force intended for effecting the combustion seal is then divided between two wires instead of the one in the gasket as designed by the manufacturer.

Still other engine builders have used conventional passenger car gaskets and either installed a wire ring that contacts the gasket on a horizontal or upper surface of the armor, or adjacent to the armor. The problem with this is that when such a wire is positioned on the armor and is loaded, the armor tends to split due to high stress levels. When such a wire is positioned adjacent to the armor, it divides the clamping forces, or causes loading on the gasket body itself to be insufficient to seal effectively in the main body of the gasket, such as around the coolant and oil holes, or both.

It is therefore an object of the present invention to provide an improved sealing mechanism for high performance engines and which includes an integrated gasket having an armor and wire which may be installed as a single unit, and without the need for utilizing separate or auxiliary sealing elements. The sealing assembly of the present invention provides effective sealing and resists both blow-out and pull-in of the wire ring in operation of the sealed engine assembly.

SUMMARY OF THE INVENTION

In accordance with the present invention, a method for sealing a high performance internal combustion engine with integrated sealing elements is provided. The engine has a head and a block, each having a main clamping surface. An associated integrated head gasket is positioned between the main clamping surfaces. The method includes the steps of providing a gasket comprising a main body having a central core and compressible composite facing layers laminated to the surfaces of the core, the main body defining a plurality of combustion openings, bolt holes and liquid passageways, and a fire ring for each combustion opening, each fire ring comprising a wire ring and an armor ensheathing the wire ring and having legs which grip the edges of the associated combustion opening, the wire ring of which may be oversized and have a thickness greater than the thickness of the main body; providing a groove in one or both of the head and the block generally concentric with each combustion opening, each groove having a land area and a generally vertical wall which intersects with the main clamping surface of the head or block; and positioning the gasket on the block relative to the head, so that when the head is torqued down, each groove receives a fire ring and compresses the wire ring to provide a primary seal therewith at the land area, the wall engages the armor to form a secondary seal, and the head and block main clamping surfaces engage the armor to clamp the armor against the main body.

In one form of the method the legs fully embrace the facing layers to provide a tertiary seal therewith against the head and the block to seal against passage of combustion gases therepast and to prevent pull-in of the armor into an associated cylinder. Desirably, at least one of the head and block main clamping surfaces define an annular corner at the edge of the groove which, under load, bears against the adjacent armor and acts with a resultant force which intersects the wire ring to provide a highly effective secondary seal for the engine. Vertically aligned groove portions may be provided in each of the head and block, each of which receives the fire ring when the head is torqued down.

The automotive engine and head gasket assembly of the present invention comprises a head, a block defining cylinders and a head gasket. The head and block together define a pair of confronting clamping surfaces and a perimetric groove surrounding each cylinder and disposed between the pair of surfaces, the groove having a pair of confronting spaced surfaces having a first vertical dimension between them. The head gasket comprises a main body of a first thickness including a central core and facing layers laminated to the core, the main body defining a plurality of combustion openings, and a fire ring disposed and secured in each combustion opening, each fire ring comprising a generally U-shaped armor having a pair of legs overlying and underlying the main body adjacent each combustion opening and a central body connecting said legs and ensheathing a wire ring for providing a combustion seal. The armor has a second vertical dimension greater than the first vertical dimension prior to assembly and which may be substantially greater than the thickness of the gasket main body, whereby, in use, the combustion seal provides a labyrinth seal against the spaced surfaces of the groove and against a corner defined by the groove.

In one form, the groove is defined in part by each of the head and block. The groove may define an entryway from the cylinder thereto, the entryway being substantially less in vertical dimension than the first vertical dimension, thereby to prevent movement of the combustion seal therethrough. The entryway may be defined in part by a locking lip formed with at least one of the head and block.

Further objects, features and advantages of the present invention will become apparent from the following description and appended drawings.

DETAILED DESCRIPTION OF THE PREFERRED EMBODIMENTS

Figure 1:
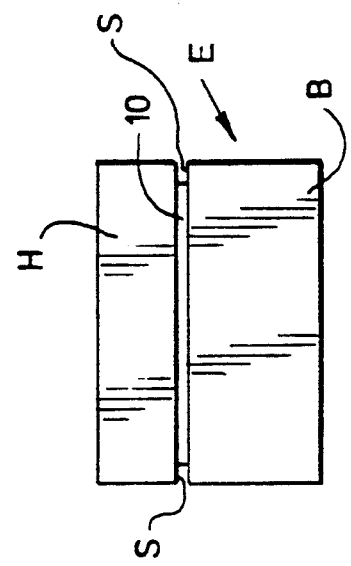
FIG. 1 is a schematic view of an automotive engine assembly in accordance with the present invention.

Referring now to the drawings, an engine assembly in accordance with the present invention comprises an engine E (shown schematically in FIG. 1) having a head H and a block B. A gasket 10 in accordance with this invention is disposed between them in a sealing relationship against their respective clamping surfaces S.

The head and block define a plurality of combustion cylinders as well as oil and coolant passages and bolt holes via which the engine assembly is clamped. The gasket 10 defines aligned, complementary combustion openings 20, coolant and oil passages 22, and bolt holes 24.

The gasket 10 comprises a main body 12 which includes a central metal core 30, such as of cold rolled steel, and facing layers 32 laminated to the surface of metal core 30. Core 30 may be solid or perforated. Facing layers may be of typical fiber/elastomer materials, such as glass fibers or other fibrous material and may utilize nitrile, neoprene, or polyacrylic elastomers as binders. Fillers and other conventional ingredients may also be present. Graphite facing layers may be used as well and if so used, will typically be used with a perforated metallic core.

At each combustion opening 20, a fire ring 40 is provided. Fire ring 40 includes an armor 42 and a wire ring 44. Wire 44 may be of low carbon steel. Copper or stainless steel wires may also be used. Armor 42 may be stainless steel and is generally of a U-shaped cross section having a closed end, which receives and ensheathes the wire ring 44, and a pair of legs 46 which overlie and grip the main gasket body at the peripheries of the combustion openings 20. The legs 46 may preferably fully embrace the peripheries of the main body or may comprise tabs, as illustrated by U.S. Pat. No. 3,560,007, for suspending the wire ring 44 in the opening.

Although the gasket 10 itself so far described employs well known features and components, it is different in the embodiment illustrated from most such gaskets by its use of an oversized wire ring 44 and an armor having a thickness which is substantially greater than the thickness of the main body 12. A typical gasket may have a body of about 0.388 to 0.452 inch with an armor having a 0.46 diameter low carbon wire and an armoring of 0.06 inch thick stainless steel for an overall armor thickness of about 0.58 inch.

The sealing system of the present invention also contemplates the provision and use of a groove 50 in one or both of the head and block of the engine. Thus, a perimetric groove surrounding each cylinder may be machined into the clamping surface S of the head adjacent and generally concentric with the combustion opening 20 in the main body 12 of the gasket. The groove may be variously configured, but it defines a recess in the head having a surface which may be referred to as a generally horizontal land area L and a generally vertical wall W extending between land area L and the confronting clamping surface S. The wall and clamping surface S intersect in a corner C which may preferably be generally square, although it may be slightly chamfered as well. The height of the groove is such that when the engine is closed and the gasket is properly positioned, the wire ring 44 will be significantly compressed. It may be possible to compress these wires less than normally done, and still seal because of the secondary seal. Less compression will reduce bore distortion and brinnelling of aluminum heads.

Figure 2:
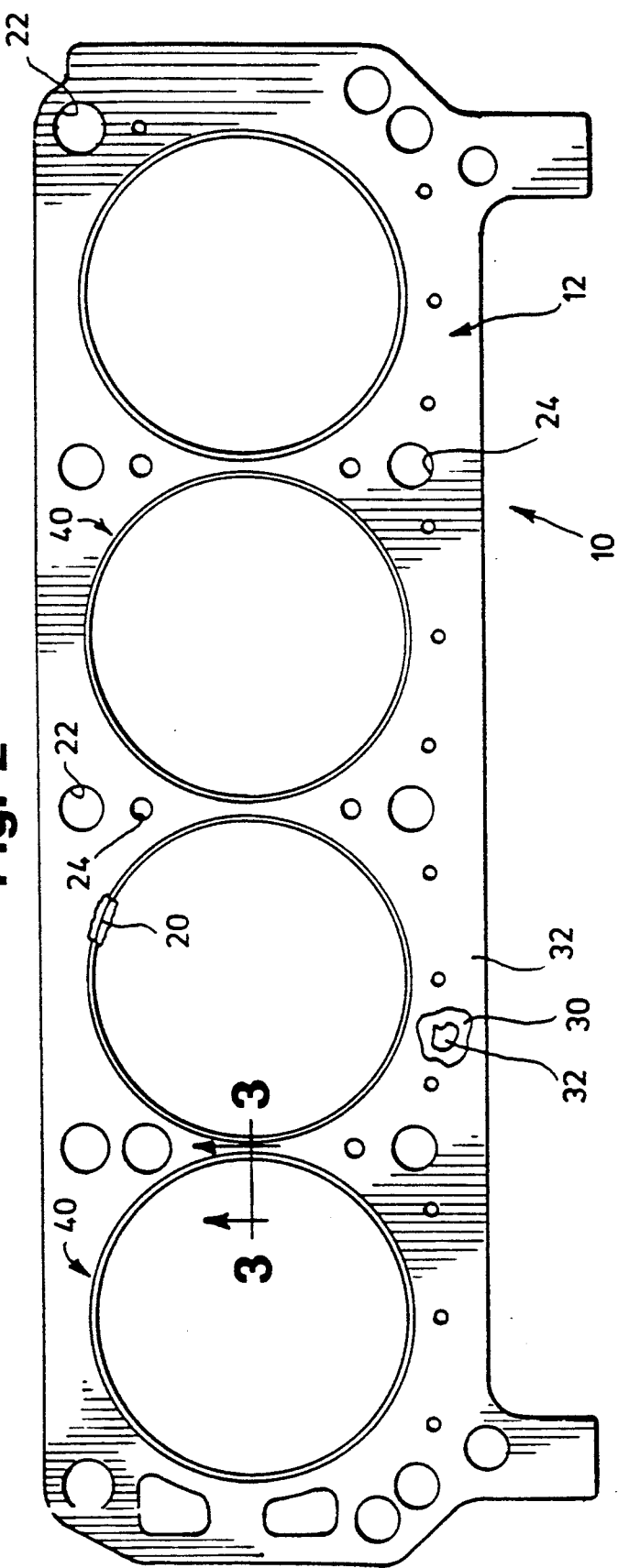
FIG. 2 is a plan view of a gasket employed in the engine assembly of FIG. 1.
Figure 3:
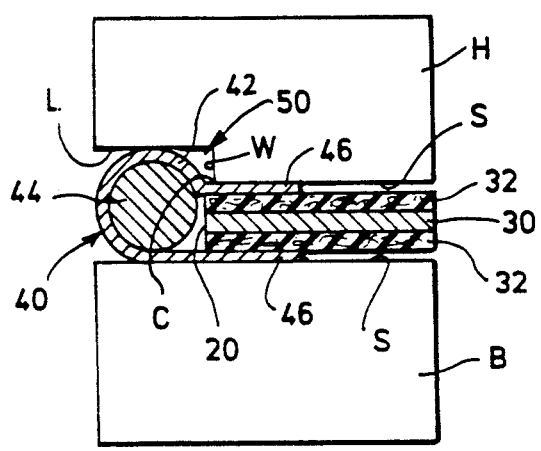
FIG. 3 is a cross-sectional view taken substantially along line 3—3 of FIG. 2.

From FIGS. 2 and 3 it will be apparent that when the gasket is positioned on the block relative to the head and the gasket 10 is torqued down between clamping surfaces S of the head and block via bolts (not shown), that the gasket is securely clamped into sealing engagement with the head and block and the wire ring is compressed. Indeed the gasket and armor produce a combustion seal which has a primary seal against the land area L, a secondary seal against the corner C and a tertiary seal against the head and block in the zone of the legs 46 of the armor at which the armor is clamped against the main body. The plural seals also produce a labyrinth effect, with any escaping gas being under reduced pressure at the secondary and tertiary seals making sealing of those zones somewhat easier. Of course, the liquid seals are provided by the composite facing layers 32.

The gasket and engine assemblies described provide combustion seals which are more effective than those currently used and which are more convenient than those typically used in high performance engines. The assemblies resist pull-in, the tendency of wire to be pulled into the combustion cylinders under high vacuum under extreme conditions. Similarly, physical blow-out of the armors and associated wire rings is avoided by the groove 50 and corner C, and by-pass of gases in extreme operating conditions is avoided via the multiple (primary, secondary and tertiary) gas seals.

Figure 4:
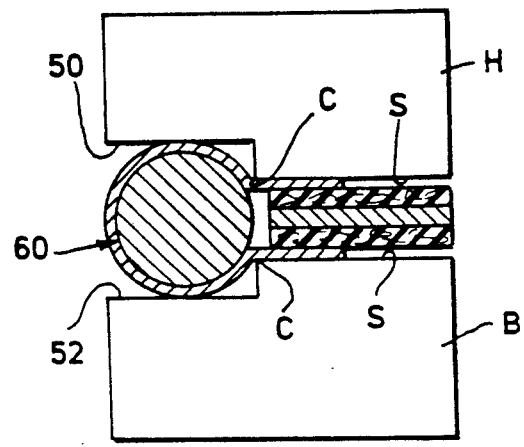
FIGS. 4—6 are cross-sectional views like that of FIG. 3, but showing other embodiments of the present invention.

Enhanced sealing and interlocking can be achieved by additionally grooving the clamping surface of the block as illustrated by FIG. 4. In that embodiment, a block groove 52 complementary to the head groove 50 is provided. These groove portions which define a pair of confronting spaced surfaces cooperate with a fire ring 60 having an armor and wire ring as just described in the same manner to provide primary and secondary seals at each of the two locations, rather than at one location, thereby enhancing the sealing potential of the assembly.

Figure 5:
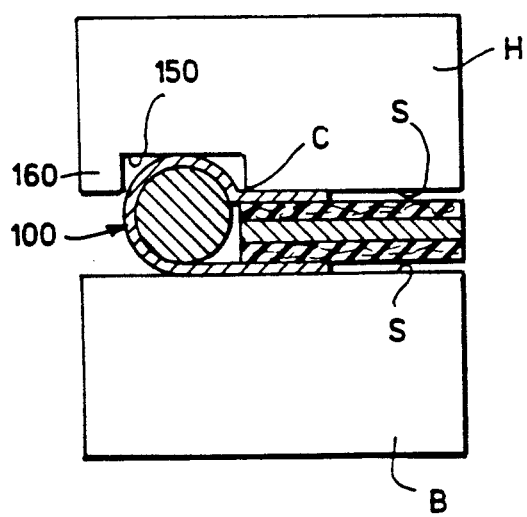
Figure 6:
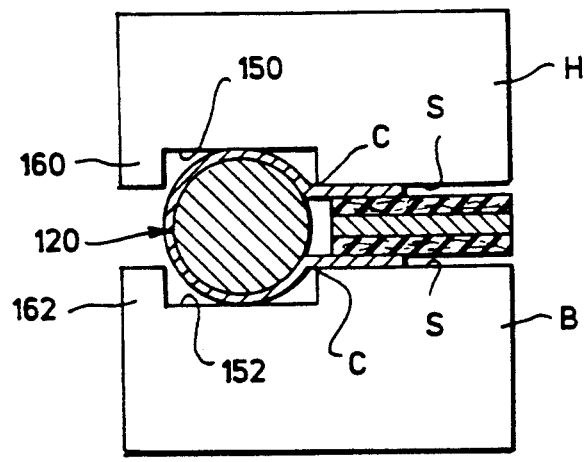

The grooves 50, 52 illustrated thus far may extend inwardly to the engine cylinders. It is also possible to recess the grooves so that they lock the armor and wire ring, not only against blow out, but against pull-in as well. FIGS. 5 and 6 illustrate that. Thus, it is seen in FIGS. 5 and 6 that an entryway to the grooves 150, 152 is provided which is defined in part by locking lips 160, 162 formed with the head or with the head and block. The locking lips define an entryway which is substantially less in vertical dimension than the distance between the confronting surfaces of the groove. The sealing effects of the grooves 150, 152 with their armors 100, 120, respectively, and their functional cooperation with the associated gasket is otherwise the same as just described with respect to the embodiments of FIGS. 1-4.

It will be appreciated that the primary and tertiary seals are effected by the torquing of the engine to a sealed condition via the bolts. At rest there is no force acting to push the armor outwardly. However, when the engine is running, the cylinder pressure tends to act outwardly against the armor in the director of arrow A (FIG. 3). Due to the torquing load imposed by the bolts (arrow X in FIG. 3), a resultant reactive load (represented by arrow R in FIG. 3) is imposed at corners C of the grooves. The angle of the resultant reactive load will vary with cylinder pressure and effective torquing load. Thus, for example, when the engine is not running, the force represented by arrow A will be zero and the resultant will be zero. The greater the pressure, considering also the torquing load, the steeper the angle at which the resultant reactive load at the corner acts against the armor. Typically under higher load conditions, the angle of the reactive resultant load effectively intersects the wire ring, thereby producing a highly effective secondary sealing effect at the corners C.

From the foregoing it will be apparent to those skilled in the art that further modifications may be made and provided without departing from the spirit of the invention. Accordingly, the scope of the invention is to be considered as limited only to the extent made necessary by the appended claims.

What is claimed is:

1. A method of sealing a high performance internal combustion engine having a head and a block, each having a main clamping surface, and an associated head gasket between said main clamping surfaces, the method comprising:

providing a gasket comprising a main body having a central core and compressible composite facing layers laminated to the surface of the core, said main body defining a plurality of combustion openings, bolt holes and liquid passageways, and a fire ring for each combustion opening, each said fire ring comprising a wire ring and an armor ensheathing said wire ring and having legs which grip the edges of the main body adjacent the associated combustion opening;

providing a groove in one or both of said head and said block generally concentric with each said combustion opening, each said groove opening into said combustion opening, each said groove having a land area and a generally vertical wall which intersects with the main clamping surface of said head or block; and positioning said gasket on said block relative to said head, so that when said head is torqued down, each said groove receives said fire ring and compresses said fire ring to provide a primary seal therewith at said land area, the wall engages said armor to form a secondary seal, and said head and block main clamping surfaces engage said armor to clamp said armor against said main body.

2. The method of claim 1, and wherein said legs fully embrace said facing layers to provide a tertiary seal therewith against the head and the block to seal against passage of combustion gases therepast and to prevent pull-in of the armor into an associated cylinder.

3. The method of claim 1 and wherein said wall and said head or block main clamping surfaces define an annular corner at the edge of the groove which, under load, bears against an adjacent armor and acts with a resultant force which intersects the wire ring to provide a highly effective secondary seal for said engine.

4. The method of claim 1 and wherein vertically aligned groove portions are provided in each of said head and block, each of which receives said fire ring when the head is torqued down.

5. An automotive engine and head gasket assembly comprising a head, a block defining cylinders, and a head gasket, said head and block together defining a pair of confronting clamping surfaces and a perimetric groove opening into and surrounding each cylinder and disposed between said pair of surfaces, said groove having a pair of confronting spaced surfaces having a first vertical dimension between them, said head gasket comprising a main body of a first thickness including a central core and facing layers laminated to said core, said main body defining a plurality of combustion openings, and a fire ring disposed and secured in each combustion opening, each said fire ring comprising a generally U-shaped armor having a pair of legs overlying and underlying said main body adjacent a combustion opening and a central body connecting said legs and ensheathing a wire ring for providing a combustion seal, said armor having a second vertical dimension greater than said first vertical dimension prior to assembly, whereby, in use, the combustion seal provides a labyrinth seal against the spaced surfaces of the groove and against a corner defined by the groove.

6. An automotive gasket and head gasket assembly in accordance with claim 5 and wherein said groove is defined in part by each of said head and block.

7. An automotive engine and head gasket assembly in accordance with claim 5 and wherein said groove is defined by said head.

8. An automotive engine and head gasket assembly in accordance with claim 5 and wherein said groove defines an entryway from said cylinder thereto which is substantially less in vertical dimension than said first vertical dimension, thereby to prevent movement of said combustion seal therethrough.

9. An automotive engine and head gasket assembly in accordance with claim 8 and wherein said entryway is defined in part by a locking lip formed with at least one of said head and block.

* * * * *